May 17, 1955 — J. H. GALLAGHER — 2,708,500
SAND AND GRAVEL LOADER
Filed Dec. 23, 1952 — 3 Sheets-Sheet 1
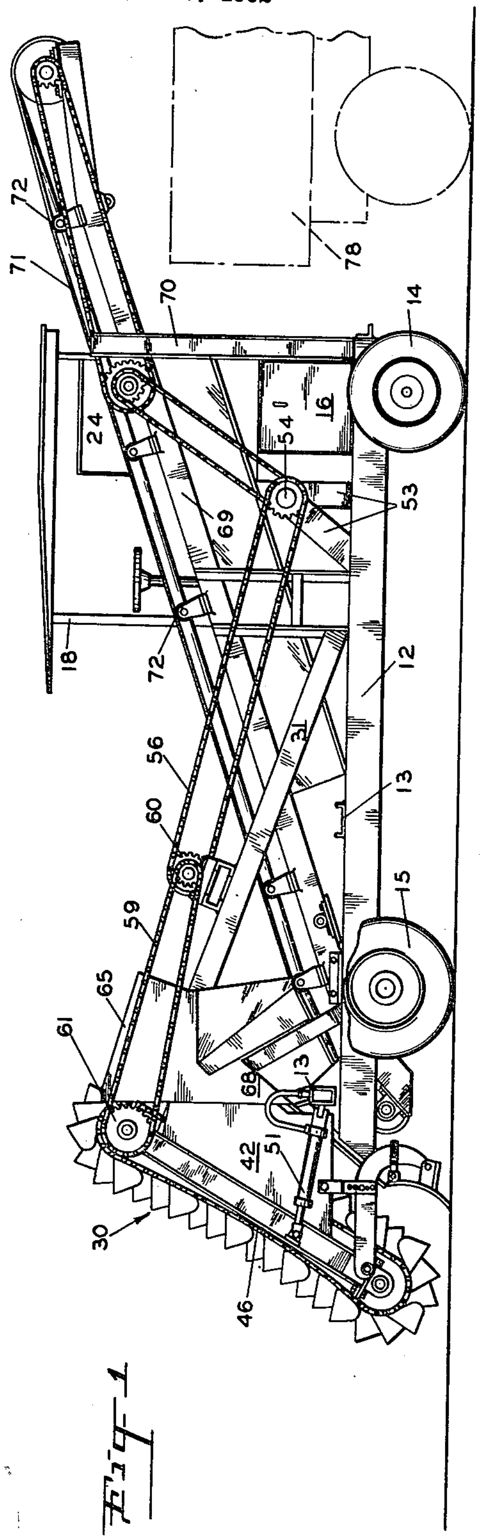
*INVENTOR.*
JOHN H. GALLAGHER
*BY* Buckhorn and Cheatham
ATTORNEY

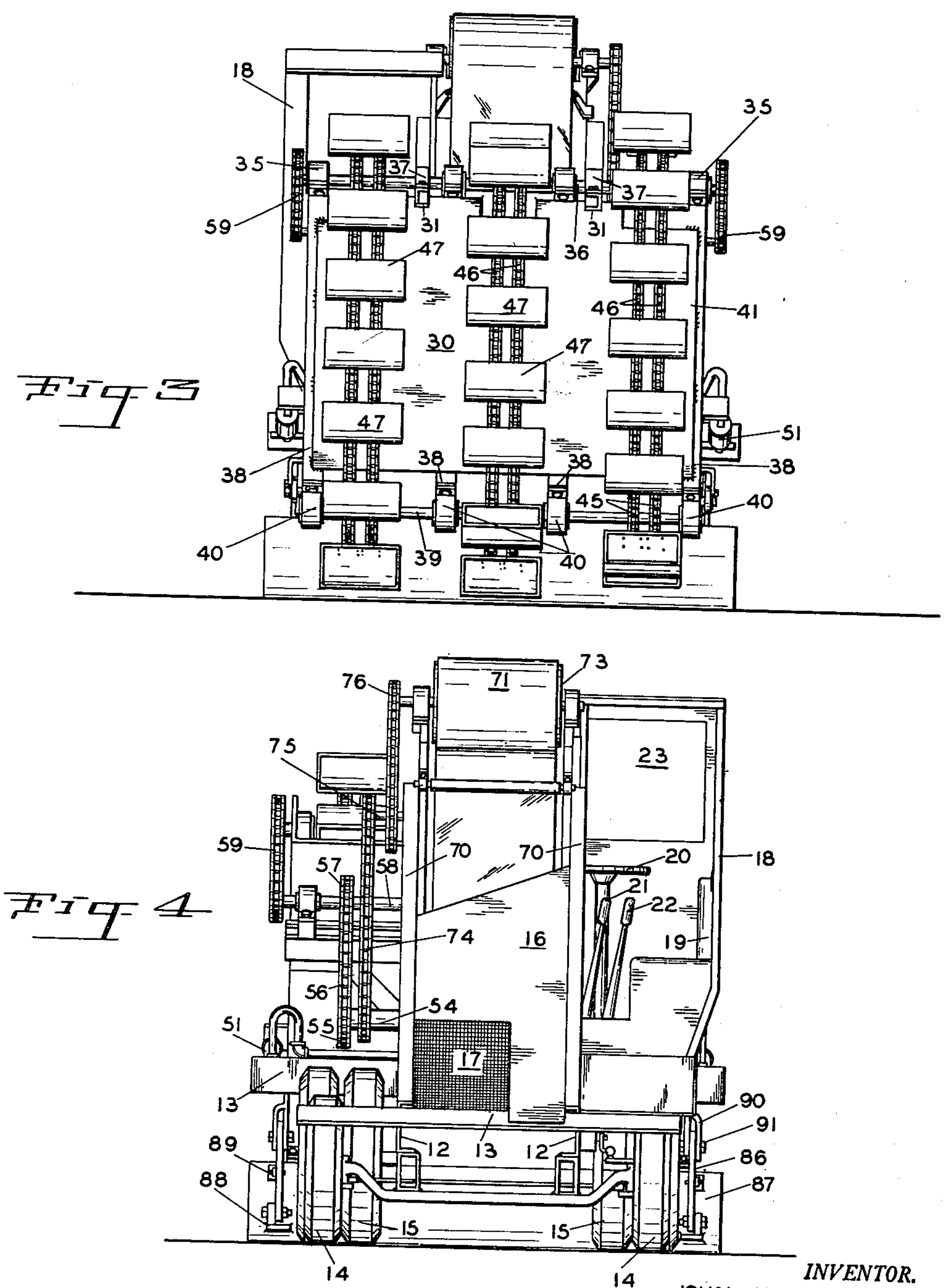
INVENTOR.
JOHN H. GALLAGHER
BY
Buckhorn and Cheatham
ATTORNEY

May 17, 1955

J. H. GALLAGHER 2,708,500

SAND AND GRAVEL LOADER

Filed Dec. 23, 1952

INVENTOR.
JOHN H. GALLAGHER

BY
Buckhorn and Cheatham

ATTORNEY

United States Patent Office 2,708,500

Patented May 17, 1955

1

2,708,500

SAND AND GRAVEL LOADER

John H. Gallagher, Corvallis, Oreg.

Application December 23, 1952, Serial No. 327,645

1 Claim. (Cl. 198—12)

The present invention relates to material handling apparatus and more particularly to apparatus for handling materials such as sand, gravel, crushed rock and the like.

It is a principal object of the present invention to provide new and improved means for quickly loading vehicles with sand, gravel, or like materials, from stockpiles of the same.

It is a further object of the present invention to provide means for loading vehicles from a stockpile rapidly, efficiently and inexpensively.

Another object of the present invention is to provide a loading mechanism adapted to gather materials from the base of a stockpile and to remove it relatively evenly and cleanly from the surface of the ground.

A further object of the present invention is to provide vehicle loading apparatus adapted to gather material directly from the surface of the ground or from a point elevated a distance thereabove.

A still further object of the invention is to provide a vehicle-mounted loading apparatus which may be rapidly moved from one location to another.

Another object of the invention is to provide a bucket conveyor type loading apparatus that may be easily and inexpensively manufactured and by reason of its design may be operated without undue strain upon and depreciation of the parts thereof.

In accordance with the present invention there is provided a loading apparatus including a wheeled vehicle having pivotally mounted at one end thereof a ladder line including a plurality of individual bucket chains. Means are provided for adjusting the angle of elevation of the ladder line whereby the elevation of the lower end thereof may be adjusted with respect to the surface of the ground. A scraper blade is mounted on the vehicle which may be positioned to scrape the ground cleanly of loose material and gather it where the buckets will pick it up in the course of their sweep around the ladder line. Also provided is a conveyor belt adapted to receive the material picked up in the buckets and to carry the material to a truck parked adjacent the loading machine. The loading apparatus is provided with its own power plant which is adapted to drive the vehicle from one point to another and also to drive the ladder line and the conveyor belt during the loading operation of the machine.

Other objects and advantages of the invention will become more apparent hereinafter from inspection of the following specification taken in connection with the accompanying drawings wherein like numerals refer to like parts throughout, while the features of novelty will be more distinctly pointed out in the appended claim.

In the drawings,

Fig. 1 is a side elevation of the apparatus of the present invention;

Fig. 2 is a top plan view of the apparatus shown in Fig. 1;

Fig. 3 is an end view taken from the left of Fig. 1;

Fig. 4 is an end view taken from the right of Fig. 1; and

2

Figure 5:
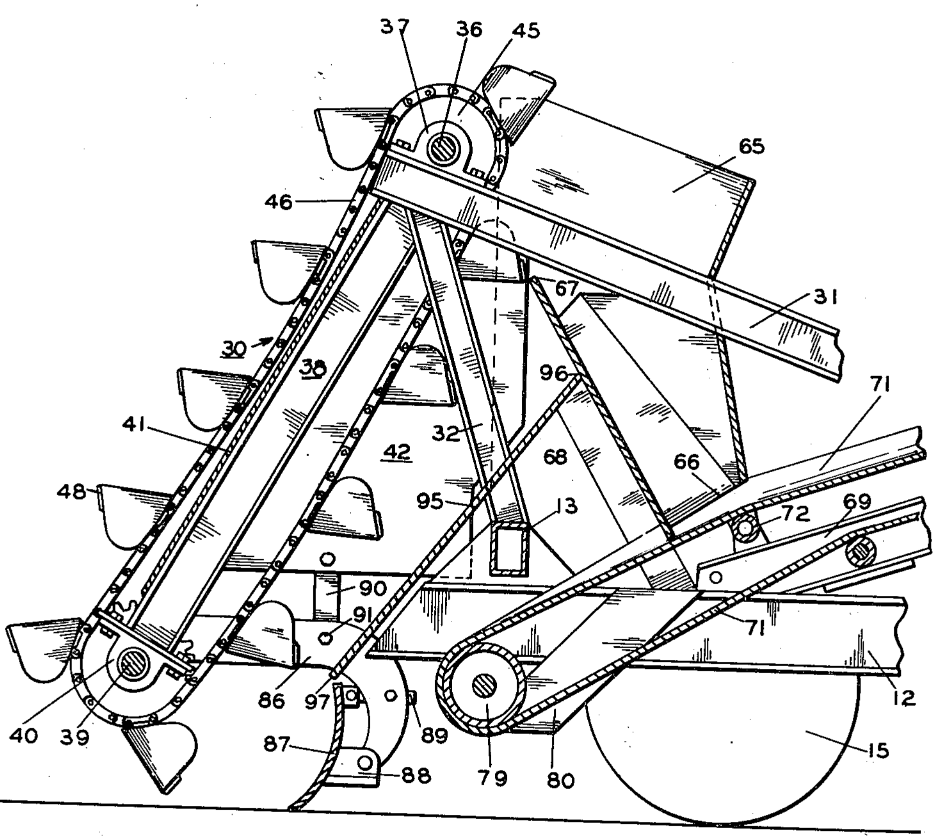

Fig. 5 is an enlarged, fragmentary, cross-sectional view taken along line 5—5 of Fig. 2.

The apparatus of the invention comprises a vehicle including a chassis defined in part by a pair of elongated side frame members 12 and a plurality of transverse frame members 13 mounted on steerable wheels 14 and driving wheels 15 which for convenience will be referred to as the rear and front wheels, respectively, with the respective ends of the vehicle correspondingly designated. Power means for operating the apparatus of the invention is provided in the form of a conventional gasoline engine or other suitable engine mounted on the chassis over the rear wheels 14 within the enclosure 16 provided with a grill 17 for the entrance of cooling air to the power means. The power means is connected to the front driving wheels 15 by any suitable gearing arrangement, neither the power means nor the means operatively connecting the power means to the front wheels 15 being illustrated since such apparatus is conventional and well known in the art. An operator's cab 18 is provided near the rear end of the chassis and offset to one side thereof and includes a seat 19 and control means for controlling the operation of the entire apparatus. Only the steering wheel 20 connected by a conventional arrangement to the steerable wheels 14, and a pair of operating levers 21, 22 are shown to represent the control means. Windows 23, 24 are provided in the cab to give the operator a clear view of the loading and discharge operations.

Pivotally mounted at its upper end on the front of the vehicle is a ladder line 30 for gathering and elevating material such as sand, gravel, crushed rock and the like. The ladder line is supported on a framework including a pair of parallel, spaced apart, elongated channel members 31, a separate one of the channel members 31 being welded to a separate one of the side frame members 12 of the chassis at a point aligned with the front end of the operator's cab and extending angularly upwardly from, and aligned with, the corresponding side frame member to a point approximately directly above the front end of the side frame member 12. Vertical support is given to the channel members 31 at the front end of the chassis by a pair of vertical supporting members 32 (Fig. 5) mounted on the side frame members 12 and welded at their upper ends to the corresponding channel member 31. The ladder line 30 includes an upper, horizontal driven shaft 36 journaled in pillow blocks 37 mounted on the ends of the channel members 31. Pivotally mounted on the upper shaft 36 by means of suitable collar assemblies 35 are four I-beam members 38 which extend angularly downwardly over the end of the vehicle in a parallel, laterally spaced apart relation and support at their lower ends an idler shaft 39 journaled in the collar assemblies 40 fastened to the lower ends of the I-beams. Preferably the ladder line includes a plurality of endless bucket lines coursing upwardly with the buckets in material carrying position and coursing downwardly in material dumping position, with the buckets gathering and carrying material during their ascent and discharging material carried therein as they begin their descent. Carried by each of the shafts 36, 39 are three laterally spaced apart pairs of aligned sprockets 45 which carry six endless chains 46 looped thereover. Carried by each of the pairs of chains are a plurality of buckets 47, the spacing between the buckets being the same on each pair of chains and the buckets on the respective chains being in staggered relation to one another as best shown in Fig. 3. The buckets 47 are preferably provided with a reinforced straight lip 48 which sweeps horizontally to the ground on the lowermost sweep of the buckets.

To steady the movement of the buckets 47 as they move upwardly, a steel plate or apron 41 is provided which is welded or fastened by other suitable means to the I-beam members 38 and on which the chains slide as they move upwardly, as may be best seen in Figs. 1 and 5. The apron 41 also distributes into the path of the machine any material spilled from the buckets in their upward course. To more completely enclose the moving apparatus, a skirt 42 is mounted on each side of the ladder line and is arranged to extend a short distance therebehind.

Angle adjusting means operatively connected between the ladder line and the vehicle chassis are provided for adjusting the angular position of the ladder line whereby the elevation of the lower end of the ladder line may be varied with respect to the ground. Referring now to Fig. 1, connected between the outside I-beam members 38 of the ladder line frame and the frontmost transverse chassis frame member 13 are a pair of hydraulic piston and cylinder means 51 for which suitable controls (not shown) are provided in the operator's cab. As is evident from the view of Fig. 1, the angle of elevation of the ladder line may be adjusted by means of the hydraulic piston and cylinder means 51 so that the bucket lips 48 just sweep the surface of the ground on their lowermost sweep around the sprockets 45 on the lower shaft 39 or, by lessening the angle of elevation, so that the buckets pass some distance above the ground.

Means are provided for operatively connecting the drive shaft 36 to the power means to drive the ladder line 30. Mounted directly in front of the motor enclosure 14 on a suitable frame 53 is a transversely extending shaft 54 extending a slight distance beyond the side frame members 12 on each side of the chassis. Shaft 54 is adapted to be driven by the power means through a conventional power transmitting arrangement (not shown) controlled from the operator's cab 18. Mounted on the opposite ends of the shaft 54 are a pair of sprockets 55, each of which carries a chain 56 looped over sprockets 57 carried on an intermediate shaft 58 rotatably mounted on the channel members 31 at a point displaced slightly behind the front wheels 15 of the vehicle. The motion imparted to shaft 58 by the sprocket chains 57, 56 is imparted to the driven shaft 36 of the ladder line by a par of chains 59 carried on sprockets 60, 61 mounted on the opposite ends of each of the shafts 58, 36, respectively.

Means are provided to receive the material discharged from the buckets as they begin their descent on the lower side of the ladder line 30. Referring more particularly to Figs. 1, 2 and 5 for the moment, the material dumped from the buckets 47 is received in a hopper 65, the walls of which taper downwardly and inwardly to a restricted opening 66 in the bottom thereof. The edge 67 of the hopper nearest the ladder line is positioned so that the lip 48 of the descending buckets just clears the edge thereof in the most vertical position of the ladder line 30. The material gathered in hopper 65 is discharged onto an endless conveyor means supported on the vehicle and extending from beneath the upper end of the ladder line upwardly and away therefrom and beyond the limits of the vehicle. Mounted on the side frame members 12 of the chassis at a point above the driving wheels, and extending angularly upwardly and beyond the rear end of the vehicle, are a pair of beams 69 supported by a pair of vertical posts 70 mounted on the rear end of the vehicle. The beams 69 form the main supporting frame for an endless conveyor belt 71 which is supported on its upper course by a plurality of transversely extending, longitudinally spaced apart, cupping rolls 72 mounted on the beams 70, and which is driven by a pulley 73 over which it passes at the upper end of the beams 70. The pulley 73 is journaled in suitable supports mounted on the upper ends of the beams 70 and is driven from the power means through the shaft 54, drive chain 74, the intermediate shaft 75 and drive chain 76. The lower end of the belt 71 is arranged to extend slightly in front of and below the opening 66 of the hopper 65 and passes around an idler pulley 79 (Fig. 5) rotatably supported on brackets 80 extending downwardly from the vehicle side frame members 12. The dotted lines 78 (Fig. 1) represent a truck or similar carrier into which the conveyor 71 is arranged to discharge.

It is impractical to mount the respective bucket lines so that the buckets on the respective lines are closely adjacent each other on the lowermost portion of their sweep, and the buckets, therefore, will not in and of themselves sweep the ground clean of the sized material being gathered thereby. To effect substantially complete removal from the surface of the ground of the material being gathered by the device of the invention, I provide a scraper blade immediately behind and beneath the ladder line which will scrape up and gather, as the device is moved forwardly, any loose material on the surface of the ground not picked up by the buckets. Referring more particularly to Fig. 5, pivotally mounted on suitable trunnions 85 extending from the lower end of each of the opposite side I-beam members 38 of the ladder line are a pair of supporting arms 86 which support a scraper blade 87 at the opposite end thereof. The scraper blade is mounted on the arm by means of a bracket 88 pivotally secured at the end of the supporting arm 86, an adjustable bracket 89 also being provided between the supporting arm and the upper portion of the scraper blade so that the angular position of the blade may be adjusted. The supporting arms 86 are attached to a hanger 90 suspended from the side skirts 42, the hanger being provided with a plurality of openings through which a bolt 91 is inserted in a cooperating opening in the supporting arm 86 to provide further means for adjusting the position of the supporting arm and scraper blade in relation to the ladder line 30. The scraper blade extends substantially parallel to the axis of the supporting shafts of the ladder line and preferably is of such a length as to extend slightly beyond the transverse limits of the vehicle. The material accumulated by the scraper blade as the vehicle is moved forwardly is gathered by the descending buckets 47 so that all the loose material on the surface of the ground is substantially completely removed from the path of the advancing wheels of the vehicle. This permits the vehicle to advance horizontally and does not cause it to climb as would be the case if material accumulated under the rear wheels, in which case the vehicle would be tilted angularly upwardly at an increasingly greater angle as the machine advanced and cause the buckets to sweep at an increasingly greater distance above the ground as the machine advanced. Since the scraper blade is mounted on the ladder line 30 it is easily raised for movement of the vehicle by tilting the ladder line 30 to raise the lower end thereof and with it the scraper blade.

Since a certain amount of clearance must be provided between the descending buckets and the edge 67 of the hopper, it is inevitable that some of the material dumped by the buckets will escape the hopper and would normally fall behind the ladder line in the path of the wheels of the vehicle. In the present invention, however, this is obviated by the provision of a spill plate 95 extending transversely of the vehicle beneath the ladder line. The spill plate 95 is welded to the side skirts 68 of the hopper 65 with the upper edge 96 of the spill plate terminating at the side of the hopper nearest the ladder line and with the lower edge 97 of the spill plate terminating above the upper edge of the scraper blade 87 and forwardly thereof when the scraper blade and ladder line are in their lowered positions as clearly shown in Fig. 5. Thus, any material which escapes the hopper 65 will be caught by the spill plate 95 and distributed in front of the scraper blade to be gathered by the descending buckets of the ladder line.

The use of a multiple bucket line ladder line is of great advantage inasmuch as it is possible to run the bucket lines at a much slower speed than would be necessary with a single bucket line and yet obtained a relatively high rate of material discharge from the machine. The slower speed is of advantage since it reduces the spillage of the buckets on their upward course from a normal twenty-five per cent with a single bucket line device to about five per cent at the normal operating speed of the present device at which it can load approximately five yards per minute. A further advantage in the use of the multiple bucket lines is that it enables the use of a staggered bucket arrangement which, together with the slower operating speed, reduces the jarring impact created when the buckets begin to dig into the stockpile of material being worked on. This factor materially reduces the depreciation rate of the machine which, by reason of the nature of their operations, is usually exceedingly high in machines of this type.

It is also apparent that the machine of the invention is extremely mobile and may be moved readily from one place to another as the need therefor arises with little loss of time involved in the movement.

Having illustrated and described a preferred embodiment of the invention, it should be apparent to those skilled in the art that the invention permits of modification in arrangement and detail. I claim as my invention all such modifications as come within the true spirit and scope of the appended claim.

I claim:

A sand and gravel loader comprising a wheeled vehicle, an inclined ladder line mounted at one end of said vehicle and having a plurality of material elevating bucket lines supported solely on said ladder line, an upper horizontally disposed drive shaft journaled at the upper end of said ladder line and drivingly connected to said bucket lines, ladder line support means on said frame including bearing means rotatably supporting said upper shaft whereby said ladder line may be pivoted about the axis of said upper shaft, hydraulic cylinder and piston means operatively connected between said vehicle and ladder line for adjusting the angle of elevation of said ladder line, operator control means for said hydraulic cylinder and piston means positioned at the opposite end of said vehicle, a scraper blade supported wholly on said ladder line and positioned therebeneath and extending the width of said vehicle for gathering loose material as said machine advances in the direction of said ladder line to clear a path for the wheels of said vehicle and place it in position for elevation by said buckets, a spill plate mounted beneath said ladder line and having a lower end above and extending forwardly of said scraper blade for catching material spilled upon discharge of said buckets and returning it for gathering by said buckets, and power means on said vehicle operatively connected to said upper shaft for driving said bucket lines.

References Cited in the file of this patent

UNITED STATES PATENTS

| | | |
|---|---|---|
| 1,283,383 | Webster | Oct. 29, 1918 |
| 1,485,812 | Pfieffer | Mar. 4, 1924 |
| 1,519,897 | Asplund | Dec. 16, 1924 |
| 1,674,329 | Haiss | June 19, 1928 |
| 1,822,598 | McClure | Sept. 8, 1931 |
| 2,624,415 | Moore | Jan. 6, 1953 |